United States Patent [19]

Oden

[11] 4,159,949
[45] Jul. 3, 1979

[54] CONTAMINANT REMOVER

[76] Inventor: Edmon F. Oden, 2611 Stoney Brook, Houston, Tex. 77063

[21] Appl. No.: 946,551

[22] Filed: Sep. 28, 1978

[51] Int. Cl.² .................... B01D 35/18; C02B 1/02
[52] U.S. Cl. .................... 210/180; 208/186;
   210/182; 210/259; 210/295; 210/322
[58] Field of Search ............. 196/46.1; 208/179, 186;
   210/71, 180–185, 252, 259, 295, 322

[56] References Cited

U.S. PATENT DOCUMENTS

| | | | |
|---|---|---|---|
| 2,274,132 | 2/1942 | Ehlers | 210/183 X |
| 3,756,412 | 9/1973 | Barrow | 210/180 |
| 3,915,860 | 10/1975 | Priest | 210/180 X |
| 4,006,084 | 2/1977 | Priest | 210/184 X |

FOREIGN PATENT DOCUMENTS

| | | | |
|---|---|---|---|
| 45927 | 10/1917 | Sweden | 210/182 |
| 403139 | 12/1933 | United Kingdom | 208/186 |

Primary Examiner—Charles N. Hart
Assistant Examiner—Richard W. Burks
Attorney, Agent, or Firm—James A. Bargfrede

[57] ABSTRACT

A system is provided for continuously removing contaminants from a fluid stream on a high volume basis, such system being adapted particularly for use with contaminated lubricating oil found in industrial heavy equipment such as drop forges which requires large volumes of lubricating oil for effective, continuous operation.

10 Claims, 9 Drawing Figures

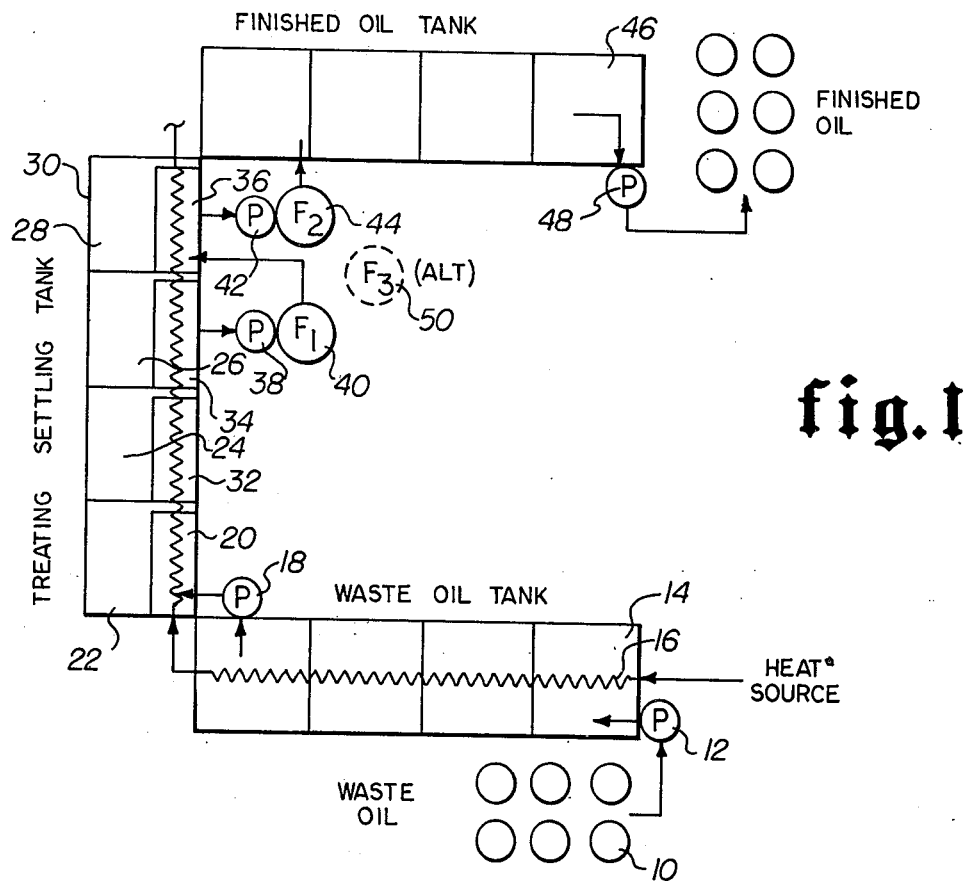
fig.1
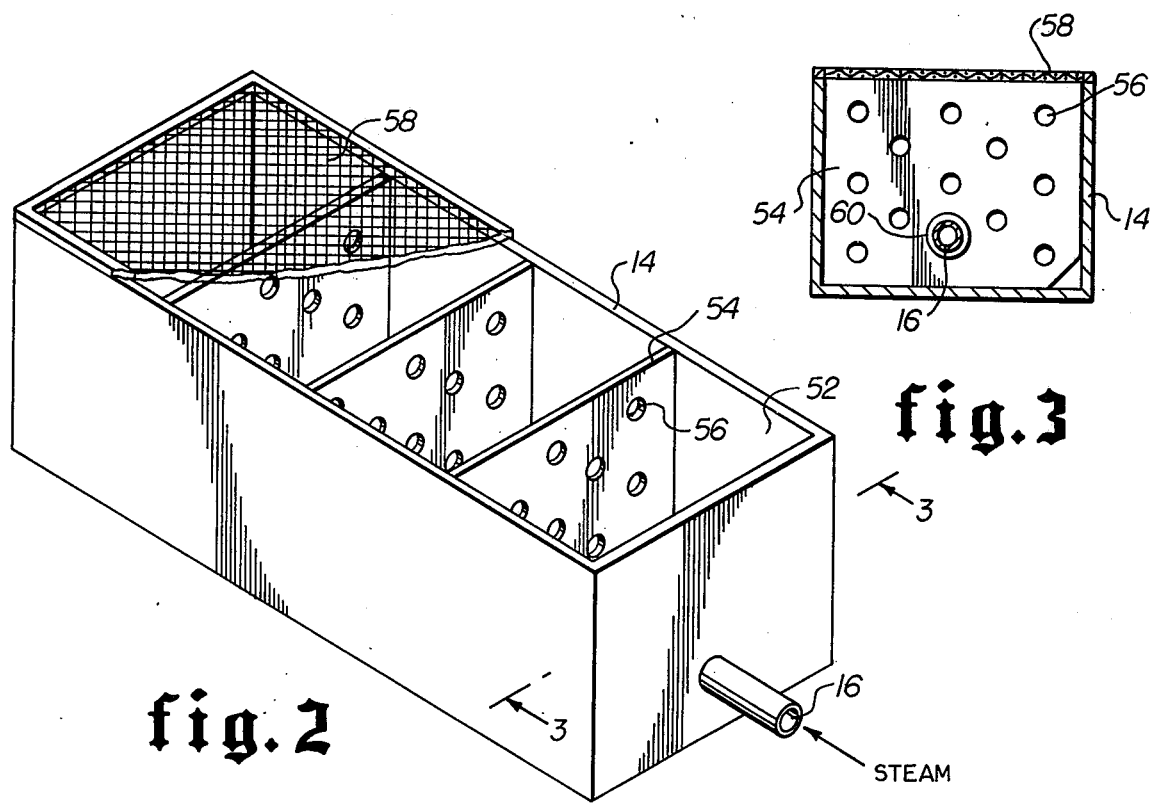
fig.2
fig.3

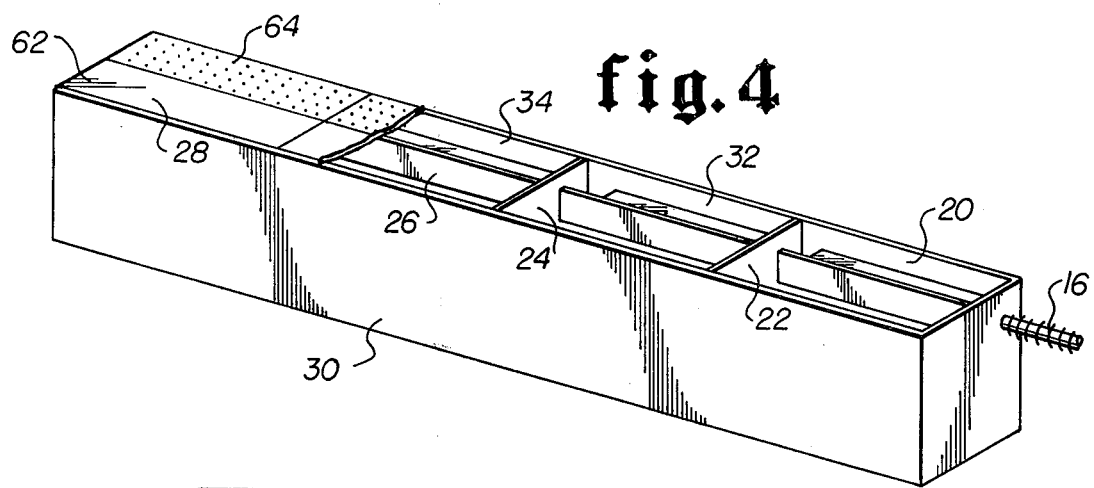
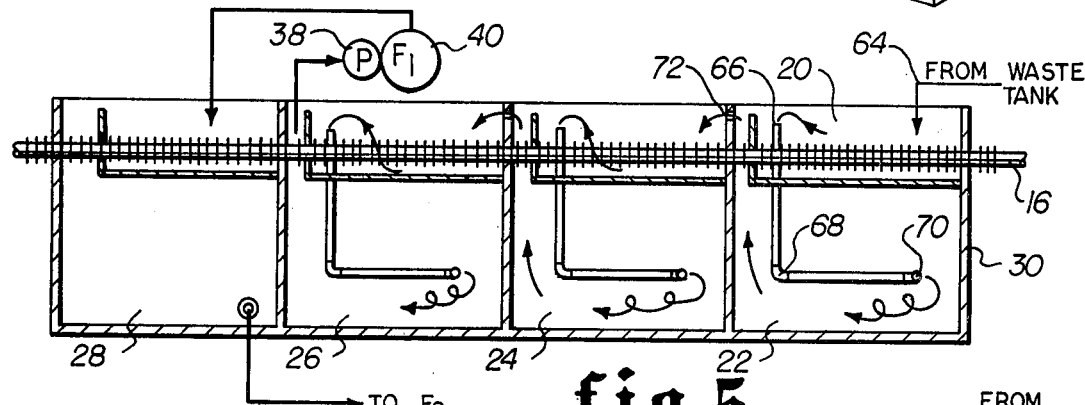
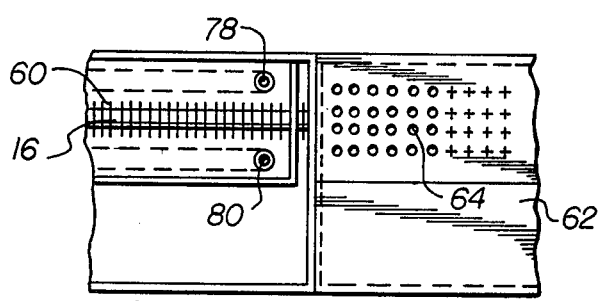
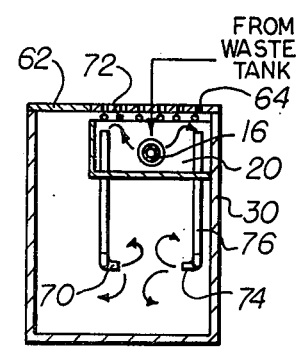
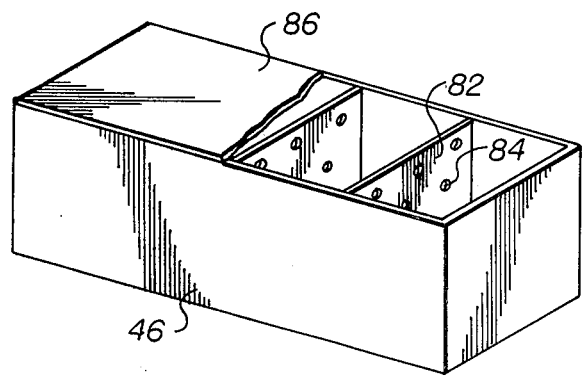

CONTAMINANT REMOVER

BACKGROUND OF THE INVENTION (a) Field of the Invention

This invention relates to a system for removing, on a high volume, continuous basis, contaminants from a fluid stream to provide a purified fluid.

(b) Description of the Prior Art

Heavy equipment requires lubrication and through such lubrication contamination to the oil or other lubricant is inevitable and present practice requires that the contaminated oil be removed from use on such heavy equipment at consequent high cost and even higher cost in the future as the price of oil rises dramatically because of a world-wide shortage of inexpensive oil.

Among the prior art known to applicant are the following U.S. Patents:

U.S. Pat. No. 3,756,412—Barrow issued Sept. 4, 1973
U.S. Pat. No. 3,915,860—Priest issued Oct. 23, 1975
U.S. Pat. No. 4,006,084—Priest issued Feb. 1, 1977

Each of the above-mentioned patents provides but one vessel which acts as a filter and is not directed to a system such as applicant's having a plurality of components which provide a high volume, continuous flow of purified oil in an inexpensive and expedient manner.

SUMMARY OF THE INVENTION

The present invention provides a system for removing, on a high volume and continuous basis, contaminants from a fluid such as hydraulic oil used in manufacturing plants. Such contaminants include solid particles and other fluid such as water.

An oil storage tank is provided for the contaminated oil which is used hydraulic oil in manufacturing plants. The contaminated oil contains solid particles and other fluids such as water.

A heated tank is connected to the oil storage tank and a finned pipe and a heater element. The heater element may be either steam or a source of electric power so that the contaminated oil is heated to a temperature of approximately 160 to 170 degrees F. Near the bottom of the heated tank, a steam pipe, if steam is being used as the heating element, contains either wet or dry steam at a low pressure of about 8 to 10 pounds per square inch.

From the heated tank, the heated oil is pumped to a treating and settling tank having four compartments, each with a trough having a heating element. In the heating and settling tank, the heated contaminated oil goes on the top of the heating element in the first trough and, as the liquid heats and rises due to volume, the liquid reaches a level where the liquid goes into two pipes, each pipe having an ell position to create turbulence. A plurality of openings connect the upper portion of the second compartment where the contaminated oil goes into a trough having a heating element. The procedure as to compartment 1 is repeated in compartments 2 and 3 but not in compartment 4.

From compartment 3, the oil is pumped to filter No. 1 where about 85% of the solids are removed. Filter 1 is of special design and is an important part of the present invention. From compartment 3, after passing through filter No. 1, the mildly contaminated oil goes to compartment 4 which is a holding compartment for storage prior to the oil being pumped to filter No. 2 and then to a finished oil tank. Filter No. 2 is substantially identical with Filter No. 1 in construction and Filter No. 2 removes the remaining solids from the slightly contaminated oil prior to flow of the purified oil to the finished oil tank. The pumps that are utilized in connection with filters No. 1 and 2, pump at the rate of approximately 1 barrel per hour.

The purified oil is removed from the finished oil tank to storage tanks for use again in the manufacturing plant operation.

BRIEF DESCRIPTION OF THE DRAWINGS

FIG. 1 is a top view of the components of the system of the present invention also shown in a flow diagram;

FIG. 2 is an upper, perspective, partial sectional view of the waste oil tank component;

FIG. 3 is a sectional, elevational end view of the waste oil tank taken along line 3—3 of FIG. 2;

FIG. 4 is an upper, perspective, partial sectional view of the treating and settling tank;

FIG. 5 is a sectional, elevational side view of the treating and settling tank;

FIG. 6 is a sectional, elevational end view of the first compartment of the treating and settling tank shown in FIG. 5;

FIG. 7 is a top view of part of two compartments of the treating and settling tank with the cover removed from the left portion;

FIG. 8 is an upper, perspective, partial sectional view of the finished oil tank.

DESCRIPTION OF THE PREFERRED EMBODIMENT

Figure 9:
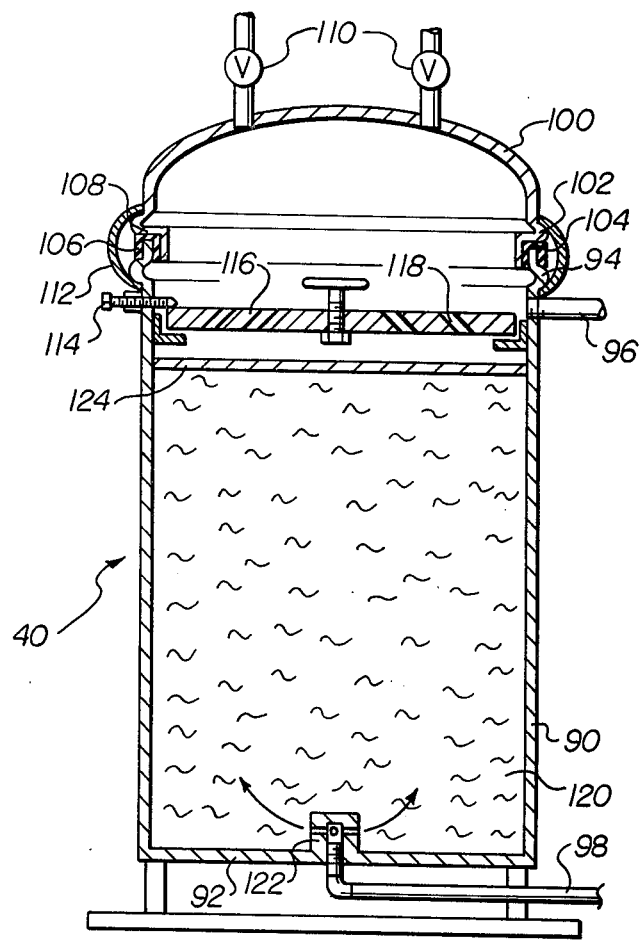
FIG. 9 is a sectional elevational view of a filter tank shown in FIG. 1.

Referring now to the drawings in detail, FIG. 1 is a top view of the components of the system of the present invention also shown in a flow diagram. Contaminated waste oil is stored in barrels such as barrel 10 and pumped by pump 12 to waste oil tank 14 having a plurality of sections. Waste oil tank 14 has a heat source which may be a finned steam pipe 16 to heat the waste oil. Waste oil tank 14 may be of suitable metal construction as are all of the compartments or tanks of the present invention.

After the waste oil is heated with wet or dry steam to a temperature of approximately 160 to 170 degrees F., the heated contaminated oil is pumped by pump 18 to the trough 20 of the first compartment 22 of treating and settling tank 30 which also has the finned steam pipe 16 in the upper portion thereof and above the trough 20. Each of the four compartments 22, 24, 26, and 28 contains troughs 20, 32, 34, and 36 and finned steam pipe 16 passes through the troughs in a manner shown in connection with FIG. 5.

From the third compartment 26, pump 38 pumps the heated contaminated oil through filter 40 to trough 36 of compartment 28 which is a holding compartment prior to the partially-treated oil being pumped by pump 42 to filter 44 where the remaining solids are removed from the oil and then to the finished oil tank 46. From the finished oil tank 46, the finished or purified oil goes to tanks or barrels such as barrel 48 for use again in the manufacturing plant.

A reserve filter 50 which is an alternate filter will be provided near filters 40 and 44 so that filter 50 may be put into use as required. Filters 40, 44, and 50 are substantially identical in construction as shown in FIG. 9.

FIG. 2 is an upper, perspective, partial sectional view of the waste oil tank 14 shown in FIG. 1. As seen in FIG. 2 there are four compartments in the tank such as compartment 52. A baffle plate 54 having a plurality of openings such as opening 56 allows waste oil to move throughout the tank. A steam pipe 16 passes through the lower portion of the tank 14 and heats the waste oil in the tank. A suitable wire mesh cover or lid 58 is positioned on top of tank 14.

FIG. 3 is a sectional, elevational end view of the waste oil tank 14 taken along line 3—3 of FIG. 2. Steam pipe 16 has a finned structure 60. The reference numerals in FIG. 3 correspond to components of FIG. 2 having the same reference numerals.

FIG. 4 is an upper, perspective, partial sectional view of the treating and settling tank 30 shown in FIG. 1. The finned steam pipe 16 is positioned in the upper portion of tank 30 which has four compartments 22, 24, 26, and 28 each with a trough such as troughs 20, 32, and 34. The cover 62 prevents the trough in compartment 28 from being seen. Cover 62 has a plurality of openings in the area 64 immediately above the troughs and heating element to allow vapor from undesirable fluids in the oil such as water, for example, to pass to the atmosphere.

FIG. 5 is a sectional, elevational side view of the treating and settling tank 30. Heated contaminated oil is discharged through line 64 into trough 20 of compartment 22. The contaminated oil passes on top of the finned steam pipe 16 in trough 20 of compartment 22 and as the oil or other fluid being processed heats and rises in the compartment 22 due to increase in volume, the oil reaches a level so that the oil goes into two pipes, one of which is pipe 66. The oil moves downwardly through pipe 66 to ell 68 and then to outlet 70 having another ell to provide turbulence when acting with the other pipe not shown in FIG. 5. A plurality of orifices or openings such as orifice 72 allows the procedure just described to be repeated in compartment 24 and in compartment 26.

Pump 38 pumps the oil to filter 40 and from filter 40 the treated oil goes to compartment 28 which is a holding compartment prior to the treated oil being pumped to filter No. 2 for removal of the remaining solid contaminants which were not removed by the first filtering process.

Thus, it will be appreciated that the oil, in high volume, flows continuously in the treating and settling tank to allow processing in an efficient manner.

FIG. 6 is a sectional, elevational end view of the first compartment 22 of the treating and settling tank 30 shown in FIG. 5. As explained previously, outlet 70 is positioned so that oil flow from a similar opening 74 in pipe 76 provides turbulence so that the oil is agitated and flows into the trough of adjoining compartment 24 by passing through orifices such as orifice 72. Cover 62 as explained previously has a plurality of openings in the area 64 above trough 20.

FIG. 7 is a top view of part of two compartments of the treating and settling tank with the cover 62 removed from the left portion so that steam pipe 16 with finned structure 60 and pipes 78 and 80 and being shown. As explained previously, cover 62 includes a plurality of openings in the area 64 to allow vapor to pass upwardly and out of the tank 30.

FIG. 8 is an upper, perspective, partial sectional view of the finished oil tank 46 shown in FIG. 1. Tank 46 contains four compartments which are formed by three plates such as plate 82 having a plurality of openings such as opening 84 therein to allow movement of the finished oil or treated oil through the tank 46. Cover 86 is attached in a suitable manner to keep foreign matter out of the treated oil.

Referring now to FIG. 9 of the drawings there is shown a sectional elevational view of a filter tank 40 shown in FIG. 1. Vessel 90 is of generally cylindrical configuration having an open top and being closed at its bottom by an integrally formed bottom plate 92. Below its upper edge is an outer roll 94. Projecting from the side of vessel 90 is a discharge spout 96. Extending through the bottom plate 92 is pipe connection 98 which is used for introducing a contaminated liquid to the interior of the vessel 90.

The upper end of the vessel 90 is closed in usage by a dome-shaped cover 100 of concave-convex cross-sectional configuration. The cover 100 is provided at its outer peripheral edge a barrel roll means 102 that sits on upper edge 104 extending outward and connecting with a sealing gasket means 106. The gasket means 106 functions to seal upper edge 104 to lower cover edge 108.

The cover 100 has threaded into openings therein outward pressure flow control means 110 when cover 100 is secured. The cover 100 is secured by placing barrel hoop means 112 over the lower edge 108 and applying pressure on sealing gasket means 106 resulting in completely sealing vessel 90.

At a plurality of circumferentially spaced locations around the vessel 90 and in approximate horizontal alignment with the pipe connection 98, a plurality of retaining lugs 114 are detachably secured to the interior surface of the wall of the vessel 90 and provide stops for the purpose of indexing the container plate 116 which is provided with a plurality of fluid passages such as 118. Thus, each of these passages such as 118 has a hole leading upward at a forty-five degree angle pointing inward to continue to agitate the cleaned fluid while moving it toward discharge spout 96.

When container plate 116 abuts retaining lugs 114, it divides the vessel 90 into an upper chamber and a lower chamber. A fibrous filter material 124 is positioned in the lower chamber during use.

In operation, filter 120 is initially placed in the lower portion of vessel 90 below retaining lugs 114 to secure the plate 116 tightly. A contaminated fluid to be purified is then sent to the vessel 90 through the pipe connection 98 in the side of the vessel, with the fluid moving toward the center of vessel 90 then entering in a centrally location position through baffle 122 which dispenses fluid in various directions through the filter, with the solid contaminants of the fluid being contained in filter 120 in the lower chamber of vessel 90. Contaminated industrial oils and other hydrocarbon or oleaginous type mixtures or suspensions are typical of those treated in the filter of the present invention. The filter 120 in the lower chamber within the vessel 90 filters out relatively large solid particles and heavy non-volatile viscous liquids. material 124 also holds the filter 120 in place.

The purified liquid passes upwardly through openings such as 118 in container plate 116 at angles pushing the purified oil counter clockwise. At the upper side of container plate 116 purified oil or other liquid is removed from the vessel through the discharge spout 96.

An important usage of the present invention is in the purification and reclamation of lubricating oil which contains, after usage, various types of solid contaminants. The lubricating oil can be cleaned or reclaimed by the removal of these contaminants by passing the oil through the filter 120 to remove the solid contaminants and produces a purified fluid in volume ready for use in its original capacity.

Although a preferred embodiment of the invention has been described in order to illustrate the principles of the invention, it will be understood that modifications in structure can be effected without departing from these principles.

What is claimed is:

1. A system for removing contaminants from a continuous fluid supply, said system including in combination:

a waste oil tank having a plurality of chambers;

a treating and settling tank positioned near said waste oil tank, said treating and settling tank having a plurality of compartments each of which has a trough;

a heating source positioned in said waste oil tank and in each of the troughs of said treating and settling tank to heat the fluid being processed;

pump means for pumping fluid being processed from said waste oil tank to said treating and settling tank;

filter means coupled to said treating and settling tank to remove partially treated fluid from said treating and settling tank; and a finished oil tank connected to said filter means for storing fluid after said fluid has passed through said filter means.

2. A system defined by claim 1 wherein said heating source is steam.

3. A system defined by claim 1 wherein said heating source is electric power.

4. A system defined by claim 1 wherein said filter means includes a first pump and a first filter tank coupled between said first pump and the end compartment of said treating and settling tank.

5. A system defined by claim 4 wherein said filter means further includes a second pump coupled to the end compartment of said treating and settling tank and a second filter tank coupled between said pump and said finished oil tank.

6. A system defined by claim 5 wherein said treating and settling tank includes a plurality of pipes positioned to provide turbulence in each compartment having at least two of said pipes.

7. A system defined by claim 1 wherein said filter means includes a filter tank having a filter in the lower portion of the filter tank.

8. A system defined by claim 7 wherein said filter tank further includes a container plate positioned above said filter and locking means for fixedly positioning said container plate in said filter tank.

9. A system defined by claim 8 wherein said filter tank further includes a top coupled with gasket means and barrel hoop means to said filter tank.

10. A system defined by claim 9 wherein said filter tank further includes a plurality of openings each having an angle of about 45 degrees in said container plate.

* * * * *